Oct. 20, 1970   R. H. REYNOLDS ET AL   3,534,535
RECIPROCATING SPINDLE FRUIT PICKER
Filed Oct. 12, 1967
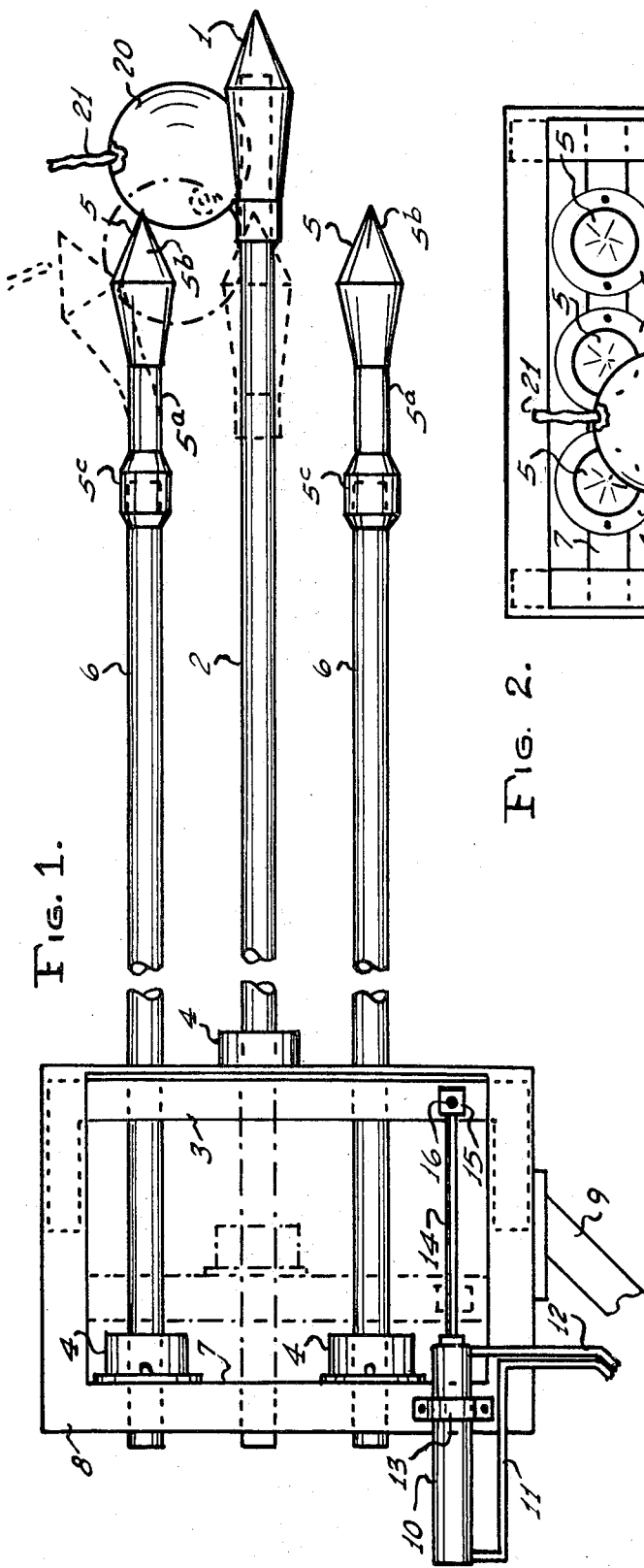
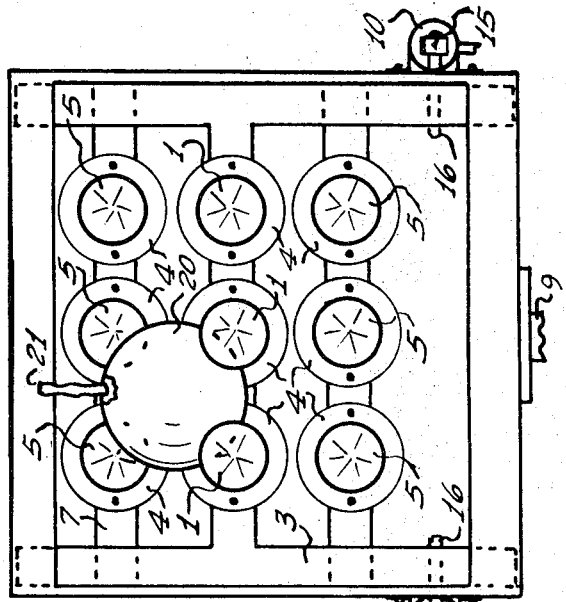
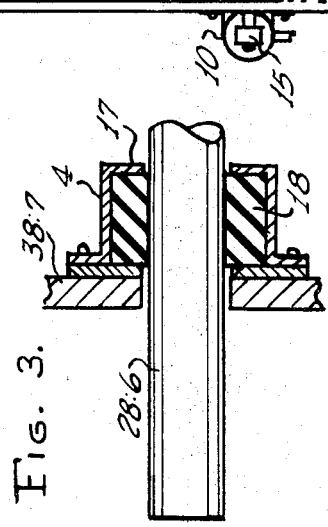
INVENTOR
ROBERT H. REYNOLDS
ELMO M. REYNOLDS

United States Patent Office 3,534,535
Patented Oct. 20, 1970

3,534,535
RECIPROCATING SPINDLE FRUIT PICKER
Robert H. Reynolds and Elmo M. Reynolds, Memphis, Tenn. (both of 810 South Dakota Ave., Tampa, Fla. 33606)
Filed Oct. 12, 1967, Ser. No. 674,955
Int. Cl. A01g *19/08*
U.S. Cl. 56—328   7 Claims

ABSTRACT OF THE DISCLOSURE

The instant device comprises groups of picking heads supported by tubes or spindles mounted on support bodies and having means to reciprocate, in an axially manner, a group of said tubes whereas when advanced into a tree a piece of fruit is grasped between picking heads and rotated to separate said fruit from its stem.

---

This invention relates to the tree picking of fruit which is not required to be handled with extreme care.

The present invention relates to a mechanical fruit picking device having a plurality of leading heads suspended, respectively, by individual support tubes adapted to penetrate tree foliage for the purpose of separating fruit from its stem. A group of said heads is spaced in relationship position to reciprocate longitudinally between non-reciprocating group of heads for the purpose of permitting fruit of desirable sizes to come in frictional engaged contact between said two groups of heads in a manner to cause a rotating action of fruit in relationship to its stem. This action effects a separation of fruit from stem without plugging or breaking the rind and is in a manner similar to hand picking. After separation, fruit is free to fall into a receiving ground catcher.

Another object of the present invention is the adapted means for providing a selection of maximum and minimum sizes of desired fruit to be picked, thus leaving the smaller crop of fruit on the tree. This selection is made by relative spacing of tubes one to the other and by selection of diameter size of heads, thus varying the space area for fruit contact between the heads.

A further object of the present invention is the adapted means provided for the cessation of forwardly progress of a head or heads, which becomes stymied by large tree limbs, for the purpose of permitting the free heads to continue their penetration of foliage.

Another further object of the present invention is the character of said groups of heads whereas they may be placed into a group for forming a picking unit as large in size as desired.

The present invention is used in combination with an auxiliary maneuvering support means and an auxiliary reciprocating power supply means.

Other important objects and advantageous features of the present invention will be apparent from the following description and the accompanying drawings, wherein, for purpose of illustration only, a specific form of the invention is set forth in detail.

In the drawings:

FIG. 1 is a perspective side elevational view of the supporting bodies, reciprocating drive, mounted tubes and picking heads;

FIG. 2 is a perspective elevational front end view showing fruit engaged with both reciprocating and non-reciprocating segments prior to separation from its stem.

FIG. 3 is a fragmentary elevational view with parts broken away and shown in section.

Referring in detail to the drawings, wherein, like and related numerals designate like and related parts throughout the several drawings, the present invention comprises a plurality of heads. In FIGS. 1 and 2, the spacing of tubes 2 and 6 relative to each other and the diameter of heads 1 and 5 vary the space area between said heads and, thereby, prevents desired sizes of fruit from passing backwardly and beyond the said area between said heads. A group of reciprocating heads 1, all being identical, are secured in a frictional and flexible manner, respectively, to support tubes 2. Said tubes extend backwardly in a horizontal manner to and through reciprocating support body 3 where said tubes are disposed in a frictional manner, respectively, by means of tube holder 4 as shown in sectional view in FIG. 3. Said holders are all identical. A group of non-reciprocating heads 5, all being identical, are secured in a frictional manner, respectively, to support tubes 6. Section 5ᵃ of head 5 being smaller in diameter and composed of flexible material and being the connecting means between the outwardly end 5ᵇ of said head and tube securing means 5ᶜ, provides the means for said head to flex with the contour of fruit as shown in phantom drawings in FIG. 1. Tubes 6 extend backwardly in a horizontal manner to and through non-reciprocating structural member 7, fixed to main body 8, wherein said tubes are disposed in a frictional and flexible manner, respectively, by means of tube holders 4 as shown in FIG. 3. Said holders are all identical.

Support body 3, being disposed in main body 8 and in a horizontal movable manner, provide the reciprocating support means for group of heads 1. Reciprocating device 10, being activated by adapted auxiliary power means supplied through tubes 11 and 12, is fixed to body 8 by its clamp 13. Shaft 14, having one end disposed in said cylinder and in a movable manner, is adapted to fitting 15 and said fitting is secured to other end of said shaft. Said fitting is adapted to receive shaft 16 and said shaft is fixed to body 3. Thus, reciprocating means are provided for body 3 and heads 1.

Main body 8 is supported by auxiliary means 9 for the purpose of moving bodies 3, and 8 in a horizontal manner backwardly and forwardly for the purpose of moving heads 1 and 5 into and out of tree.

In FIG. 3, housing 17 provides a chamber for frictional and flexible ring 18 and is secured to bodies 3 and member 7 as required. The frictional holding ability of said ring, being sufficient to maintain a static position of tubes 2 and 6 under reasonable axially directed forces due to coming in contact with small tree limbs, is adapted to permit said tube to move within its frictional grasp when said force is greatly increased due to heads 1 and/or 5 being stymied by a larger limb contact. Said ring 18 composed of frictional and flexible material having flexing characteristic is adapted to provide means for tubes 2 and 6, held respectively in grasp of said ring, to move transversely when forced up, down or sideways upon striking a large limb in an oblique manner.

In FIGS. 1 and 2, fruit 20 is shown suspended by its stem 21. Heads 1, being at the outwardly end of their travel during the reciprocating travel, provide an area sufficient for fruit of desirable sizes to come into position between heads 1 and 5. The backwardly reciprocating travel of heads 1 forces said fruit backwardly in frictional engaged contact with heads 5. Said contact continues with said backwardly travel of heads 1 and, thereby, turns fruit in a rotated pulling like manner position in relationship to its stem, thus effecting a separation of fruit from stem. Said fruit is then free to fall. Said rotating action is shown in phantom drawings in FIG. 1. Heads 5 positioned below heads 1 are in identical character performance as heads 5 positioned above heads 1.

In the operation of the instant device, tubes 2 are axially directed in continuous reciprocating manner during the period when tubes 2 and tubes 6 are advanced into a tree by any convenient maneuvering means supporting main body 8.

Although there have been shown and described herein preferred forms of the invention, it is to be understood that the invention is not necessarily confined thereto, and that any change or changes in the structure of and in the relation arrangements of components thereof are contemplated as being within the scope of the invention as defined by the claims appended hereto.

What is claimed is:

1. A fruit picking unit comprising a main support body, a movable support body mounted on said main support body, means mounted on said main support body and connected to said movable body so as to reciprocate same relative to said main body, at least two elongated tubes having one end mounted on said main body, a fruit contacting head mounted on the other end of each tube, at least two elongated tubes disposed adjacent said first mentioned tubes and having one end secured to said movable body and free ends disposed beyond said heads on said first mentioned tubes, a fruit contacting head disposed on each of said free ends and defining with said first mentioned heads an area for receiving individual pieces of fruit for harvesting such that upon the disposal of a piece within said area and movement of said movable heads relative to the non-movable heads said piece of fruit is contacted by said heads, rotated and in the process is separated from its stem.

2. The device according to claim 1 wherein auxiliary support means are connected to said main support body for moving said picking unit toward and away from a fruit tree.

3. The device according to claim 1 wherein said tubes are frictionally supported at said one end on said main body and said movable body.

4. The device according to claim 1 wherein said tubes are flexibly supported at said one end on said main body and said movable body.

5. The device according to claim 1 wherein a housing mounts said one end of said tubes on each said body and a friction ring is disposed within said housing and frictionally holds the periphery of each tube.

6. The device according to claim 1 wherein said heads are resilient and removable so that different size heads may be used.

7. The device according to claim 1 wherein the heads on said first mentioned tubes have a central portion of reduced cross section so as to permit the tip portion thereof to flex transversely thereof as said movable tubes and heads move during the harvesting operation with a piece of fruit therebetween.

References Cited

UNITED STATES PATENTS

| | | | |
|---|---|---|---|
| 3,040,507 | 6/1962 | Lasswell | 56—328 |
| 3,077,720 | 2/1963 | Grove et al. | 56—328 |
| 3,153,311 | 10/1964 | Pool | 56—328 |
| 3,197,952 | 8/1965 | Lasswell | 56—328 |
| 3,347,587 | 10/1967 | Frost | 56—328 XR |

RUSSELL R. KINSER, Primary Examiner